Dec. 23, 1952   S. G. WIECHERS   2,622,413
REFRIGERATING APPARATUS OF THE INTERMITTENT ABSORPTION TYPE
Filed June 14, 1948   2 SHEETS—SHEET 1
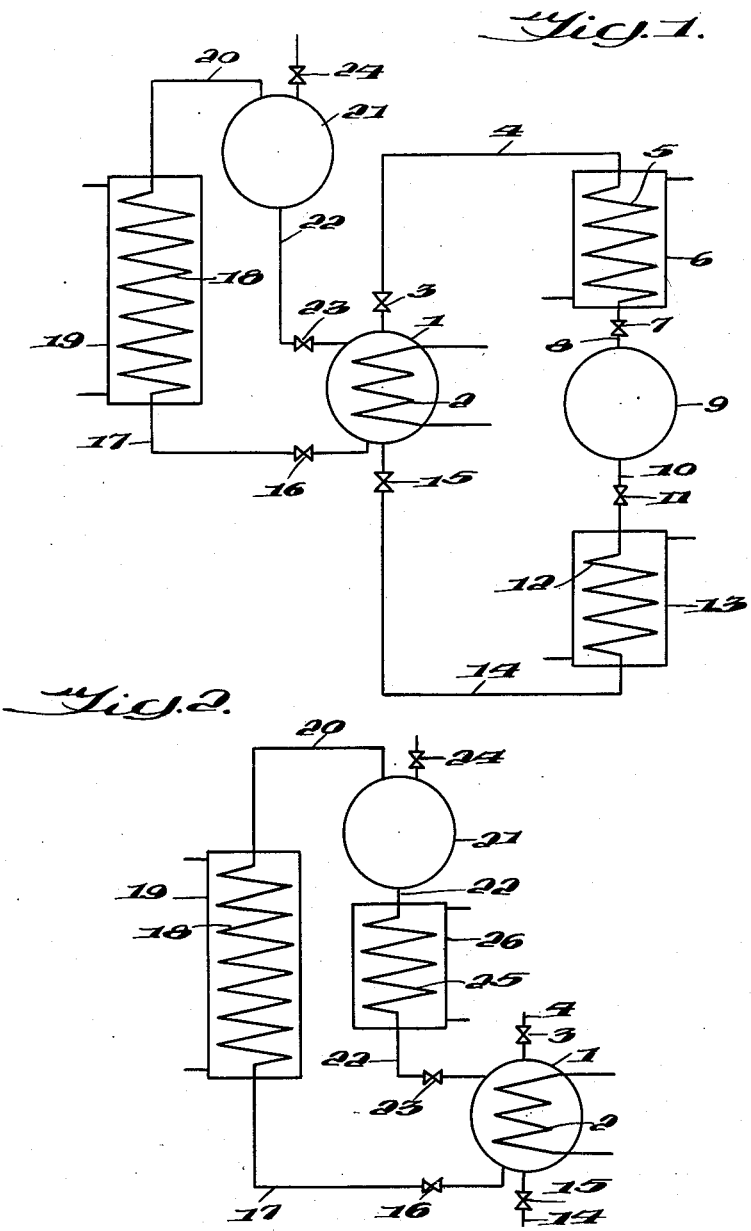
INVENTOR
SYBRANDUS GERHARDUS WIECHERS,
BY 
ATTORNEY Patented Dec. 23, 1952

2,622,413

UNITED STATES PATENT OFFICE 2,622,413

REFRIGERATING APPARATUS OF THE INTERMITTENT ABSORPTION TYPE

Sybrandus Gerhardus Wiechers, The Hague, Netherlands, assignor to De Nederlandsche Centrale Organisatie voor Toegepost-Natuurwetenschappelijk Onderzoek, The Hague, Netherlands, a corporation of the Netherlands Application June 14, 1948, Serial No. 32,894
In the Netherlands July 4, 1947

10 Claims. (Cl. 62—118)

This invention relates to refrigerating apparatus of the intermittent absorption type and more specifically to improvements in such apparatus and in the method of operating same whereby more rapid and efficient operation are obtained.

Fig. 1 represents diagrammatically the known apparatus of this type (reference numerals 1 to 15 included) as well as an embodiment of the improvement according to my invention (reference numerals 16 to 27 included), said known apparatus consists mainly of a generator-absorber 1 provided with a coil 2, fed with steam during the generating period, and with a cooling medium, generally cold water, during the absorption period. A pipe 4 provided with a cock or valve 3 connects the generator-absorber with a coil 5 of a condenser 6 in which the gaseous refrigerating medium produced in the generator 1 is liquified. The liquid refrigerating medium is stored in the storage tank 9. When the generating process is terminated, the storage tank is cut off from the condenser by means of the cock 7 provided in the duct 8 connecting said condenser with said storage tank and the refrigerating process proper can begin. The liquid refrigerant flows from the storage tank 9 through the pipe 10 and the cock or valve 11 to the evaporating coil 12, located in the evaporator 13, refrigerating by doing so the brine which traverses the evaporator 13. The evaporator coil 12 is connected by means of the return pipe 14 with the generator-absorber 1 where the evaporated refrigerant is absorbed. In order to enable the weak liquor in tank 1 to absorb gaseous refrigerant the liquor must be cooled, and this cooling process following upon the generating process must precede the evaporation of the liquid refrigerant stored in the tank 9. The cooling takes place by means of a cooling medium, generally cold water, circulating through the coil 2 located in the generator-absorber tank. This cooling continues throughout the whole absorption process in order to remove the absorption heat liberated when the gaseous refrigerant is absorbed by the liquor in the tank 1. When the entire quantity of refrigerant of the storage tank 9 has been evaporated and reabsorbed in the absorber tank 1 the refrigerating period, properly speaking, is terminated, and the weak liquor in tank 1 has been enriched to form the strong liquor, so that the cycle can be restarted by again feeding with steam the coil 2 in tank 1 after cock 15 in duct 14 has been closed.

An important disadvantage of this known process is that, while the generating process lasts about 2 or 3 hours during which the refrigerant is expelled from the strong liquor contained in the tank 1 and condensed to liquid refrigerant, which is stored in the tank 9, the weak liquor in tank 1 must be cooled to a suitable temperature before the refrigerating period, properly speaking, can begin, as it has already been set forth above. The hot weak liquor in tank 1 has to be cooled in order to be able to absorb the gaseous refrigerant obtained by the evaporation of the liquid refrigerant in the evaporator 13. This cooling of the weak liquor lasts about four hours with known apparatus. Its long duration is due to the fact that it is impossible to locate in the generator-absorber tank 1 sufficient cooling surface to remove rapidly the excess of heat. The cooling process is moreover slowed up by the fact that the liquor to be cooled is practically at rest, which influences unfavorably the transmission of heat.

The invention consists in the provision of a method and means by which the cooling period of the weak liquor is considerably reduced and the four hours previously needed can be reduced to about 30 minutes. To this end a receiver tank connected with the generator-absorber tank is provided into which receiver tank the weak liquor can be admitted after termination of the generating process and from which it can reflow into said generator-absorber, special cooling means being provided to cool the weak liquor outside the generator-absorber and the arrangement of the tanks being such that no special pump means are required to bring about the circulation of the weak liquor. It is a principal object of the invention so to improve the known apparatus and the method of operating it.

Several embodiments of the invention are represented in the drawings in which the same parts are indicated by the same reference numerals, and in which:

Fig. 1 represents schematically a known refrigerating apparatus of the intermittent absorption type provided with an embodiment of the invention;

Fig. 2 represents partially the same known type of refrigerating apparatus provided with another embodiment of the invention in which coolers are provided in both the supply and the return ducts of the receiver;

Fig. 4 represents the embodiment of Fig. 3 provided with an additional cooling coil in the receiver.

Figure 3:
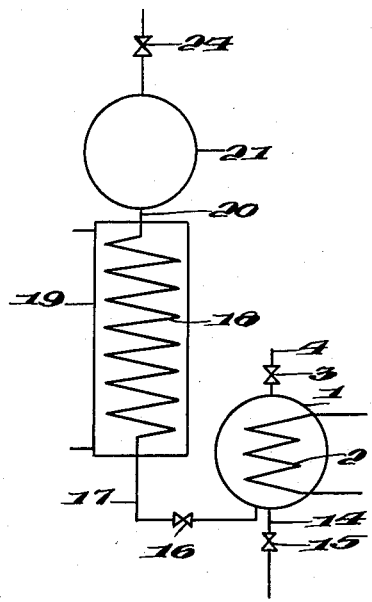
Fig. 3 shows similarly an embodiment of the invention in which supply and return take place through the same duct.

In Fig. 1 the reference numerals 1 to 15 represent a known arrangement of a refrigerating apparatus of the intermittent absorption type as described above, whereas the other numerals indicate parts constituting an embodiment of the invention. In this figure reference numeral 19 is a cooler in which is located a coil 18 dimensioned so as to present a sufficient cooling surface for the weak liquor to be cooled. The cooling is performed in the following way: When the generating process has come to an end, the generator-absorber tank 1 contains the hot weak liquor, and a pressure prevails in said tank which is substantially higher than the atmospheric pressure. When after generation, the cocks 3 and 15 are closed, connection is made between the tank 1 and the coil 18 of cooler 19 by opening the cock or valve 16, and practically all of the weak liquor is forced by the pressure prevailing in tank 1 through duct 17 into the receiver 21, traversing on its way the cooler 19, a very small fraction remaining in tank 1, which is now mainly filled with a mixture of gaseous refrigerant and vapour of the absorbent. The pressure prevailing in tank 1 must obviously be, in the arrangement according to Fig. 1, sufficiently high to overcome the resistance in the circuit, the pressure prevailing in the receiver 21 as well as the potential head of the liquid due to the fact that the receiver is located at a higher level than the tank 1. If, on the contrary, the receiver 21 is located at a lower level than the tank 1, the potential head will obviously contribute positively to the transfer of the liquid from tank 1 to receiver 21. These considerations hold equally for the embodiments according to the Figs. 2, 3, and 4, as well as for other possible arrangements. The heat transmission of the weak liquor to the cooling medium is facilitated by the relatively high velocity of said liquor. At a given moment practically the entire quantity of the weak liquor is cooled and accumulated in the receiver tank 21, after which the connection of said tank with tank 1 is cut by closing cock 16. By now circulating cooling medium as e. g. cold water in the coil 2 of tank 1, the pressure of the gaseous refrigerant in the tank 1 is considerably and very rapidly decreased. This decrease is due to the condensation of the absorbent in the tank 1 and the absorption of the gaseous refrigerant in the remainder of the weak liquor, which is now diluted by the absorbent condensate. The rapidity with which the decrease of pressure is obtained is due to the very small quantity of matter remaining in tank 1 to be cooled.

The cooled weak liquor stored in the receiver 21 can now be readmitted into the generator-absorber tank 1 by opening the cock 23 in the connecting line 22. The return flow takes place as a result of the difference in pressure in the tanks 1 and 21 and of the potential head of the liquid, which latter will have a positive effect in the arrangement according to Fig. 1, but a negative one if tank 21 is arranged below tank 1. These considerations obviously hold for the embodiments according to Figs. 2, 3 and 4, as well as for other possible arrangements.

The receiver tank 21 is provided with a vent 24 by which air eventually present in tank 21 can be evacuated if desired. This evacuation takes place during the filling of tank 21 with the cooled weak liquor, but is not strictly necessary for the operation.

Another embodiment of the invention is represented in Fig. 2. In this embodiment an additional cooler 26 with cooling coil 25 is inserted in the reflow duct 22 to obtain an additional cooling of weak liquor returning from the receiver 21 to tank 1. If during this return flow the cooled liquor arriving in tank 1 has a lower temperature than the temperature of the cooling surface of coil 2, an additional acceleration of the reflow is obtained.

In the embodiment represented by Fig. 3 the duct 22 connecting the receiver 21 and the generator-absorber 1 is omitted. The weak liquor stored in tank 21 flows back to tank 1 through the same duct and cooler through which it is forced into the receiver.

Figure 4:
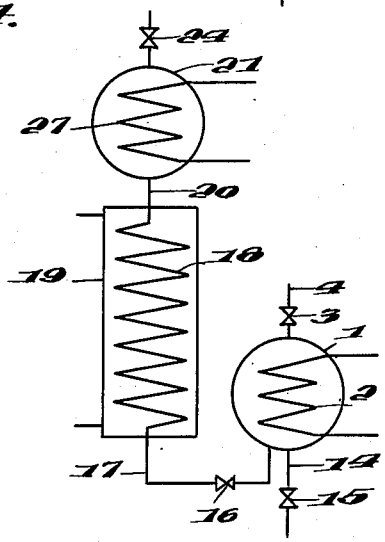

To enlarge still further the effective cooling surface it is possible to provide another cooling coil 27 in the receiver tank 21, as is shown in the embodiment of Fig. 4, which figure represents an arrangement of parts otherwise identical with that of Fig. 3. It is obviously possible to combine the cooler 27 located in the receiver tank 21 with arrangements represented in other of the figures.

If, in an apparatus according to the invention, the pressure in the generator-absorber 1 is insufficiently high to force all of the liquor into the receiver 21, it is possible to open cocks 3 and 7 and so to apply the pressure prevailing in the liquid refrigerant storage tank 9 to the tank 1.

It is evident that the coolers which in the drawings are schematically represented as coils can be in reality of any suitable shape as e. g. plate coolers or other cooling devices.

From the above it should be clear that the invention permits considerable shortening of the weak liquor cooling period and a corresponding increase in the effective refrigerating period. Moreover it is possible economically to achieve lower temperatures in the generator-absorber tank than those used heretofore and so to obtain a quicker absorption in the refrigerating period.

It is also possible in the course of the absorption period to cool the liquor of the generator-absorber tank again, thus keeping the temperature of the absorber lower during the absorption period, which equally results in a more energetic absorption.

I claim:

1. A refrigerating apparatus of the intermittent absorption type comprising in series in a closed circuit a generator-absorber unit containing absorption liquor and provided with means for alternatively heating and cooling said unit, a condenser, a storage tank for liquid refrigerant, an evaporator, the improvement comprising a closed receiver for the liquor equipped with an air release valve, conduit means having closing means therein, said conduit means connecting the receiver with said unit to permit the liquor to be forced by the varying pressure in said unit from said unit to the receiver and back from the receiver to said unit, and cooling means outside said unit in said conduit means to cool the liquor at least on its flow to the receiver.

2. Refrigerating apparatus as set forth in claim 1, in which said cooling means is located in the conduit means carrying the liquor to said receiver.

3. Refrigerating apparatus as set forth in claim 1, in which separate conduit means carry said liquor from said unit to said receiver and from said receiver to said unit, said cooling means being located in both said conduits.

4. Refrigerating apparatus as set forth in claim 1, and cooling means being located in said receiver.

5. In refrigerating apparatus of the intermittent absorption type comprising in series in a closed circuit a generator-absorber unit containing absorption liquor and provided with means for alternatively heating and cooling said unit, a condenser, a storage tank for liquid refrigerant, an evaporator, the improvement comprising a closed receiver for the liquor, a single conduit connecting the receiver with said unit to permit the liquor to be forced by the varying pressure in said unit from said unit to the receiver and back from the receiver to said unit, closing means in said conduit between said unit and said receiver, and cooling means outside said unit to cool the liquor at least on its flow to the receiver.

6. In refrigerating apparatus of the intermittent absorption type comprising in series in a closed circuit a generator-absorber unit containing absorption liquor and provided with means for alternatively heating and cooling said unit, a condenser, a storage tank for liquid refrigerant, and an evaporator, the improvement comprising a closed receiver tank to receive substantially the entire volume of weak liquor, conduit means connecting the receiver tank with said unit and having an intake orifice substantially adjacent the lowest point of said unit, means for selectively opening and closing said conduit means, to permit substantially the entire volume of the weak liquor to be forced by the varying pressure in said unit from said unit to the receiver tank and back from said tank to said unit, and cooling means outside said unit to cool the weak liquor at least on its flow to the receiver tank.

7. A method of operating intermittent absorption type refrigerating apparatus of the type having in series in a closed circuit a generator-absorber unit containing absorption liquor and provided with means for alternatively heating and cooling said unit, a condenser, a storage tank for liquid refrigerant, an evaporator, and a receiver tank to receive substantially the entire volume of weak liquor, conduit means provided with closing means and having an intake orifice substantially adjacent the lowest point of said unit, said conduit means connecting said receiver tank with said unit, and cooling means outside said unit to cool the weak liquor at least on its flow to the receiver tank; the method comprising the steps, during the portion of the cycle of operation occurring between the generating and the refrigerating periods, of removing substantially the entire volume of the weak liquor from said unit to said receiver tank, cooling said liquor while out of said unit, cooling the interior of said unit and returning said liquor to said unit, said removal and return of liquor being accomplished by use of the pressure resultant from the difference in gaseous pressures prevailing in the receiver tank and said unit respectively and the pressure head of the liquor, said cooling of the liquor being carried out, at least in part, during passage of liquor from said unit to said receiver tank.

8. Refrigerating apparatus as set forth in claim 6, in which said cooling means is located in the conduit means carrying the liquor to said receiver.

9. Refrigerating apparatus as set forth in claim 6, in which separate conduit means carry said liquor from said unit to said receiver and from said receiver to said unit, said cooling means being located in both said conduits.

10. Refrigerating apparatus as set forth in claim 6, and cooling means being located in said receiver.

SYBRANDUS GERHARDUS WIECHERS.

REFERENCES CITED

The following references are of record in the file of this patent:

UNITED STATES PATENTS

| Number | Name | Date |
| --- | --- | --- |
| 1,161,678 | Howe | Nov. 23, 1915 |
| 1,324,610 | Mild | Dec. 9, 1919 |
| 1,428,958 | Hapgood | Sept. 12, 1922 |
| 1,850,527 | Allyne | Mar. 22, 1932 |
| 2,285,788 | Woodson | June 9, 1942 |
| 2,308,520 | Lithgow | Jan. 19, 1943 |
| 2,436,945 | Sutton | Mar. 2, 1948 |
| 2,525,431 | Sorensen | Oct. 10, 1951 |